C. P. DUBBS.
METHOD FOR TREATING PETROLEUM AND OTHER HYDROCARBONS.
APPLICATION FILED NOV. 27, 1916.
1,231,509.
Patented June 26, 1917.
4 SHEETS—SHEET 1.
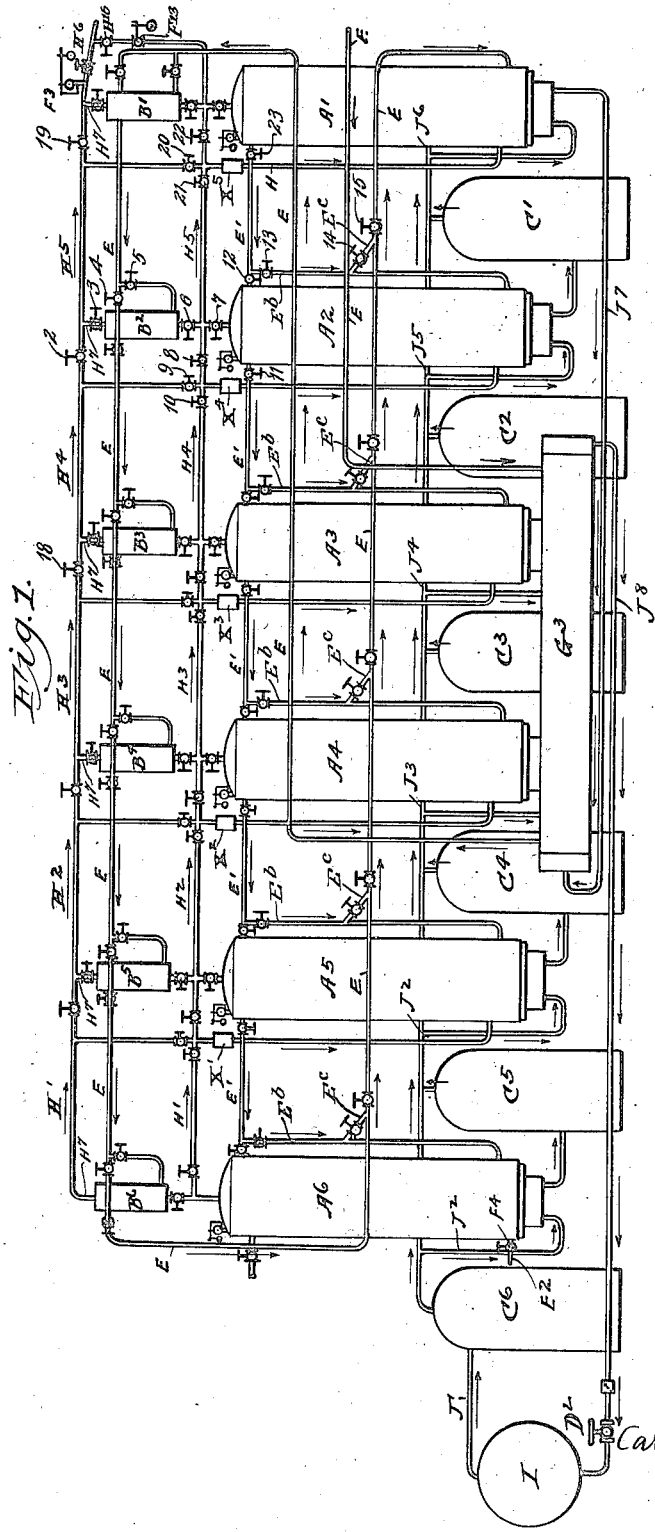

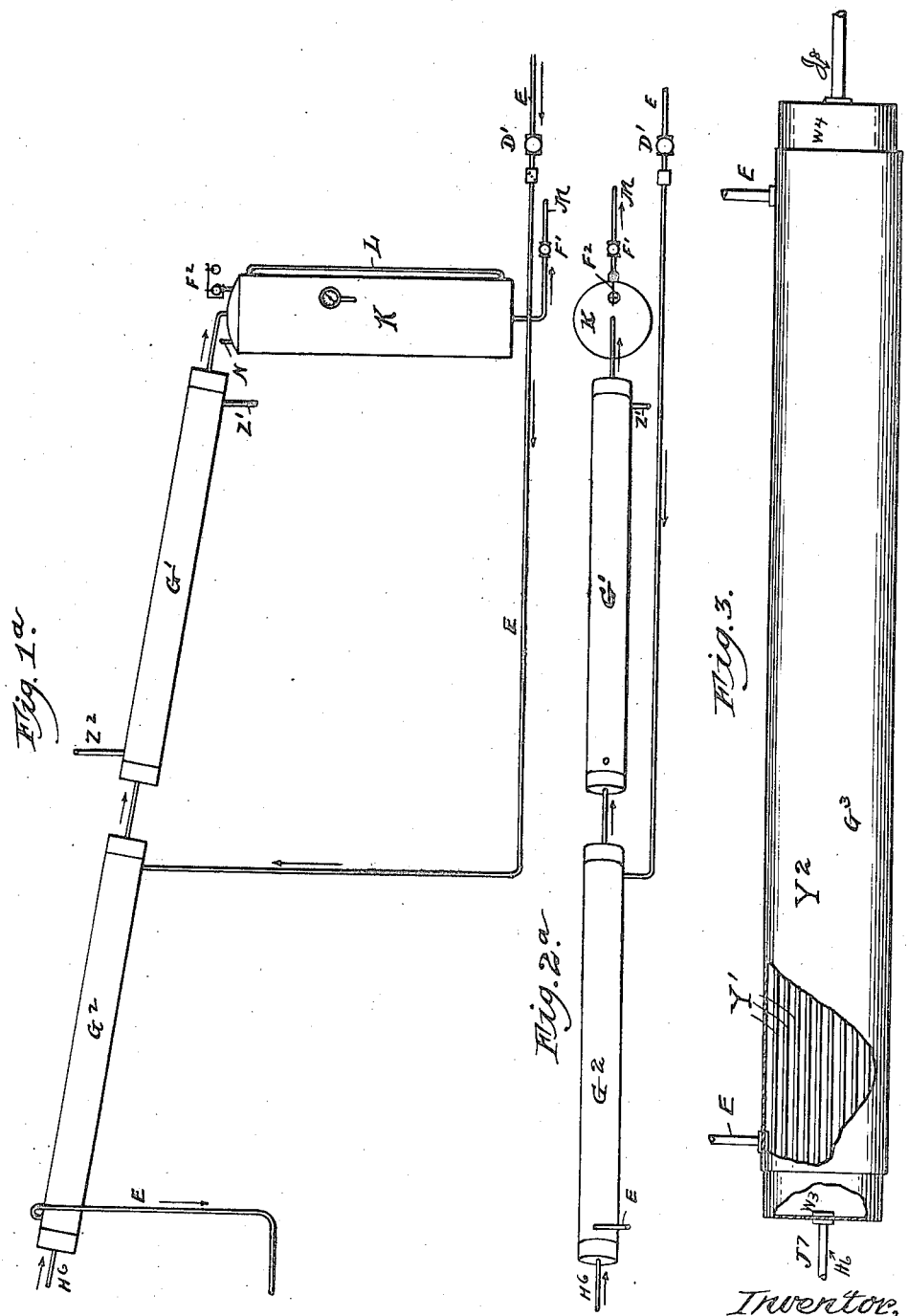

C. P. DUBBS.
METHOD FOR TREATING PETROLEUM AND OTHER HYDROCARBONS.
APPLICATION FILED NOV. 27, 1916.
1,231,509.
Patented June 26, 1917.
4 SHEETS—SHEET 3.
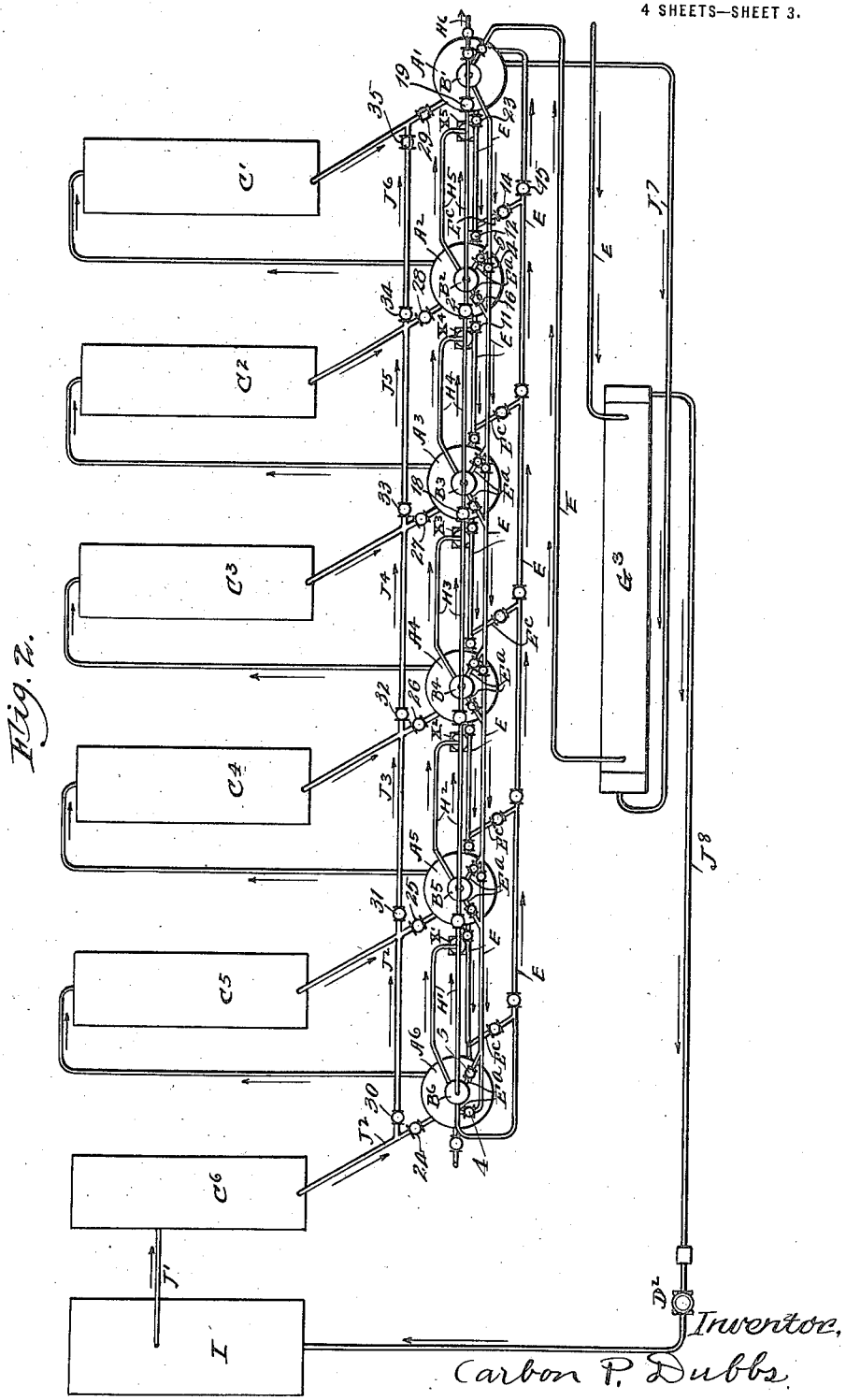
Inventor,
Carbon P. Dubbs.

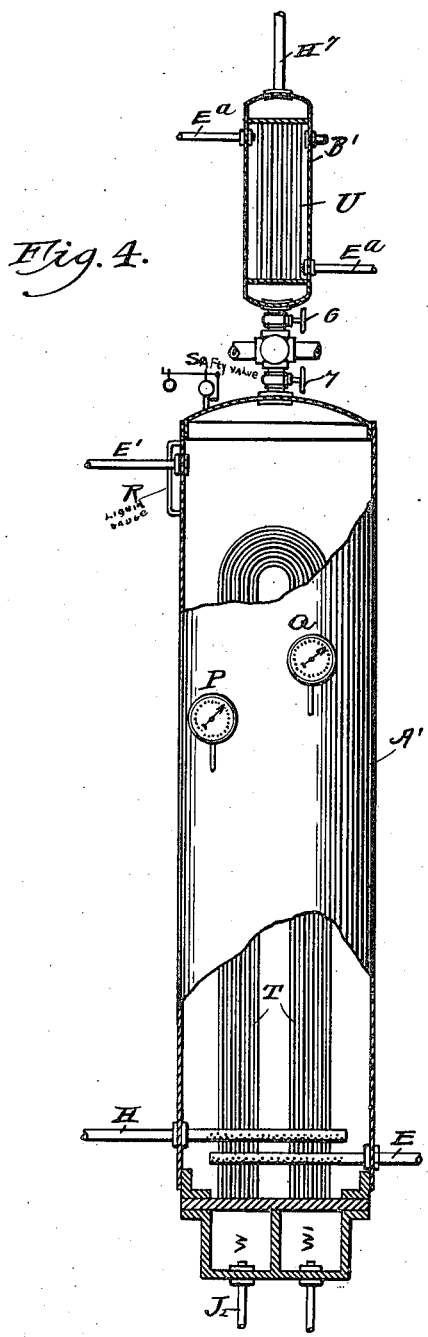

UNITED STATES PATENT OFFICE.

CARBON P. DUBBS, OF WILMETTE, ILLINOIS.

METHOD FOR TREATING PETROLEUM AND OTHER HYDROCARBONS.

1,231,509.

Specification of Letters Patent.

Patented June 26, 1917.

Application filed November 27, 1916. Serial No. 133,527.

*To all whom it may concern:*

Be it known that I, CARBON P. DUBBS, a citizen of the United States, residing in Wilmette, county of Cook, and State of Illinois, have invented certain new and useful Improvements in Method for Treating Petroleum and other Hydrocarbons, of which the following is a specification.

This invention relates to a method for treating petroleum and other hydro-carbons to produce hydro-carbon products having lower boiling points than those treated.

The invention contemplates a method whereby crude petroleum, petroleum distillates, petroleum, residuum, or other like material can be placed in the apparatus and a gasolene like product produced. Other objects of the invention are; to provide a process in which the oil being treated is fractionally distilled and subjected to a cracking, breaking up, and polymerization process to convert heavier hydro-carbons or like substances into lighter, and then such changed or converted oil fractionally distilled as one uninterrupted process, and during such process, passing the vapors and gases generated back through the liquid body and incidentally thereby reducing the amount of uncondensable gases and unsaturated hydro-carbons; to provide a method whereby more or less of the hydro-carbon treated can be converted into the product desired; to provide a method wherein the heat units are utilized with the greatest efficiency; to provide a method in which a series of stills and chambers are employed and in which the hydro-carbons treated are subjected to progressively increasing temperatures; to provide a method in which the vapor and gases are subjected to progressively decreasing temperatures, the vapor and gases being preferably allowed to percolate up through the various chambers and stills, advancing from those having the higher temperatures to those having the lower temperatures; to provide a method wherein the vapors, whether the condensable vapors or the uncondensable gases, and the liquid are caused to contact with each other in the zones of re-action; to provide a process and method of operating which is facilitated by the use of pumps.

The invention also resides in such features of construction and such process or method features as will more fully be hereinafter described.

In the drawings:

Figure 1 and Fig. 1ª is a diagrammatic side elevation of an apparatus by which my method can be carried out.

Fig. 2 and Fig. 2ª is a top plan view of the construction shown in Fig. 1.

Fig. 3 is an enlarged side elevation, partly in section of one of the heat interchangers.

Fig. 4 is an enlarged side elevational view, partly in section, of one of the stills.

Describing in detail the method with reference to the particular apparatus shown in the drawings, $A^1$, $A^2$, $A^3$, $A^4$, $A^5$, and $A^6$, it being understood any number of stills may be used, designate the stills in which the petroleum or other hydro-carbons to be treated are subjected to the action of heat. $G^2$ designates a heat interchanger, by which more or less of the heat contained in the final vapors and gas distilled off are transmitted to the incoming supply of raw material.

In practice, the oil is pumped or fed through the line E so as to go through the heat interchanger $G^2$, and then out through line E to the heat interchanger $G^3$. From the latter heat interchanger the oil passes through the lines E to a series of reflux condensers marked $B^1$, $B^2$, $B^3$, $B^4$, $B^5$, and $B^6$, and then through line E into the bottom of the still $A^1$, the flow of the incoming charge of raw material being shown by the arrows positioned adjacent the pipe E, or any other combination of the apparatus may be used that will accomplish the desired results, for instance, the raw material may be pumped directly into the heat interchanger $G^3$ and from there go directly into the bottom of any of the stills.

The raw material in the still $A^1$ is heated to drive off the vapors, the temperature depending, to a considerable extent, upon what product is desired. The vapors and gases generated in the still $A^1$, pass up through the reflux condenser $B^1$; in which the heaviest vapors condense and return to the still while the uncondensed vapors and gases pass through the pressure regulated valve $F^3$ and through the line $H^6$ into heat interchanger $G^2$; and from there through the water condenser $G^1$, into receiving tank K, sufficient pressure being maintained on this tank to force the distillate to any desired point and the gases generated to any desired point.

The residuum remaining in still $A^1$ overflows through pipe $E^1$ and enters the bottom of still $A^2$, which still is maintained at a higher heat, and the vapors and gases which are generated at the higher heat in this still $A^2$, pass up through reflux condenser $B^2$, the heavier vapors being condensed and returned to the still $A^2$, while the lighter vapors and gases pass through vapor line $H^5$ and pump $X^5$ and discharged through pipe H into the bottom of the still $A^1$, along with any condensed vapors, and percolate up through the oil contained in still $A^1$. The function of the pumps shown at $X^1$, $X^2$, $X^3$, $X^4$, $X^5$, being to force the vapors, along with any condensed portion of the vapors and incondensable gases, down through pipe H and out through the perforations in this pipe, into the bottom of the stills and thus facilitate the operation; these pumps may be of the spiral or rotary type of standard design and be operated by belt or by any of the other well known standard methods. The pumps themselves do not necessarily create a pressure on the apparatus, but are primarily for overcoming the pressure exerted against the vapors in pipe H created by the height of the columns of liquid contained in the stills.

The residuum remaining in the still $A^2$ overflows through pipe $E^1$ into still $A^3$ at the bottom, still $A^3$ being maintained at a higher heat than the preceding still $A^2$. The vapors which are generated at the higher heat in still $A^3$, along with the gases, then pass up through reflux condenser $B^3$, the heavier vapors being condensed and return to the still $A^3$, while the lighter vapors and gases pass through the line $H^4$ and pump $X^4$ to the bottom of still $A^2$ and are discharged along with any condensed vapors, through pipe H in the same manner as described with the preceding still.

The residuum remaining in still $A^3$ overflows through pipe $E^1$ into still $A^4$, the heat in this still being higher than in the preceding still. The same cycle of operation is then carried out for each still of the series so that by the time the residuum reaches the last still of the series it will have been subjected to progressively increasing temperatures until the desired amount has been converted into product desired. The residuum remaining in still $A^6$ is drawn off continuously or intermittently through the valve $F^4$ through pipe $E^2$ or through valve shown on side of still near the top, such residuum being passed through heat interchangers similar to $G^2$ and thus preheating the incoming supply of raw material, such residuum is rerun through the apparatus, either with or without any previous treatment, or with or without being mixed with other material.

It will be noticed that the raw material in passing through the apparatus forms a pool in each still and is subjected in the various stills to a progressively increasing temperature while the vapors and gases given off have not only been made to percolate up through the liquid and caused to mix with the liquid in the zones of re-action, but have also been caused to travel in the reverse direction from the liquid so as to be subjected to progressively decreasing temperatures. This arrangement permits the vapors and gases to be subjected to comparatively high and low temperatures without excessive pressure, while the vapors in their final form, as they pass to the condenser, have been scrubbed through the liquid and their temperature greatly reduced so that as they pass from the still $A^1$ to the condenser, they are at a relatively low temperature to that to which they have been subjected in the farthest still.

This novel method of treatment will tend to prevent any heavy vapors, or such vapors which have not been sufficiently treated, from passing to the condenser since the stepdown in temperature, as the vapors and gases pass through the various stills toward the condenser, will tend to condense any heavy vapors and cause them to be carried back with the residuum and again subjected to the higher temperature. Another material advantage of this method of treatment lies in the fact that the vapors and gases being stepped down in temperature by percolating through the liquid in the successive stills having lower temperatures, the heat units which are extracted in cooling the vapors and gases are transmitted to the liquid which is traveling in the reverse direction and is stepping up in temperature.

While any desired method of heating the still may be employed such as the usual furnace, or internal electric heat, I have in the drawings shown the stills as designed to be heated by steam. In detail, the steam heating arrangement comprises the boiler I, and a plurality of super-heaters $C^1$, $C^2$, $C^3$, $C^4$, $C^5$, and $C^6$. The purpose of these superheaters is to permit the temperature in the various stills being independently regulated and maintained at the progressively higher temperature for the various stills. In operation, the steam is generated in the boiler I, and passes through the steam line $J^1$ in the superheater $C^6$ and from there passed through pipe $J^2$ to the heating coils T, which are located in each of the stills. The steam is discharged through the pipe $J^2$ into the inlet manifold header W and then passes through the coils T to the outlet manifold $W^1$, from which it passes to the super-heater $C^5$. Here the steam may be reheated to secure any predetermined temperature for the still $A^5$. Should the heat units given up by the vapors and gases percolating through any still be sufficient to maintain the desired temperature in that particular still, the steam can be by-passed entirely from such still or stills, or partially by-passed by means of partly or wholly closing valves 24, 25, 26, 27, 17 and 29, and partly or wholly opening valves 31, 32, 33, 34 and 35. The purpose of the arrangement is to permit the independent regulation of the temperatures of any one or all of the stills, while utilizing to the highest degree, the heat units given up by the vapors and gases being cooled from heating the liquid in the various stills.

After the steam has been utilized for heating, the various stills, its heat units are further conserved by transferring them into the incoming raw material by means of one or more heat interchangers $G^3$. The operation of this heat interchanger $G^3$ is as follows:

Steam is admitted through the pipe $J^7$ into the inlet manifold header $W^3$ from which it passes through the pipes Y to the outlet header $W^4$, from which it is returned through the pipe $J^8$ to the boiler I.

In addition to the heat interchanger $G^3$, I preferably employ the heat interchanger $G^2$, in which the heat units of the vapor and gases, as finally discharged from the still $A^1$, are transferred to the incoming raw material. If a further cooling of the resultant vapors is necessary, a water cooler, having a water inlet $Z^1$ and water outlet $Z^2$, is positioned around the portion of the pipe $H^6$, leading to the distillate and gas receiving tank K, from which the resultant product in both liquid and gaseous form are received and discharged to their respective storages.

The reflux condensers are also utilized as heat interchangers in that the oil coming from the pipe E is discharged into chamber surrounding the pipes U (Fig. 4) of the reflux condenser and then pass out through the pipe E near the upper end. Thus the heat units extracted from the vapors are transformed to the incoming raw material. The apparatus, however, is preferably arranged so that any one or multiple of these reflux condensers can be used or by-passed. Also the vapor lines are so arranged that the vapors and gases can be by-passed from any one or any multiple of the reflux condensers or stills. Also for convenience, in repairing or for other purposes, the apparatus should preferably be so constructed that any of the stills, heaters or condensers can be by-passed without in any way affecting the operation of the rest of the apparatus, suitable valves being provided. Any number of stills, reflux condensers, condensers, heat interchangers, etc., can be employed.

In the normal operation of the process, all of the parts are used, that is, none of the reflux condensers and none of the stills are by-passed or cut out of the system. In this condition the valves are arranged as follows:—

Valves 3, 5, 6, 7, 9, 11, 13, 15, 16, 28, 20 and 23 are opened while valves 2, 4, 8, 10, 12, 14, 19, 21, 22 and 34 are closed. The body of oil being treated passes as follows: The oil enters reflux condenser $B^1$, passes around the vapor pipes U in same, then out and then through the succeeding reflux condensers, in like manner, and from last reflux condenser, the oil enters still $A^1$ through perforated pipe in bottom of still connected to pipe E, overflows through pipe $E^1$ to perforated pipe in still $A^2$ and so on through each succeeding still, and is drawn off from last still through valve $F^4$. If it is desired that the oil do not pass through any reflux condenser, to prevent the oil getting too hot, as for example reflux condenser $B^2$ valves 5 and 16 would be closed while valve 4 would be opened. If it is desired that the oil flowing from one still to the next succeeding still enter the top instead of the bottom of the succeeding still, as for example enter the top of still $A^2$, then valve 13 would be closed and valves 11 and 12 opened, and the oil would then flow into and out of top of still.

The vapors generated in the different stills normally are passed up through the reflux condensers and then forced down and into the bottom of the next still through perforated pipe H, excepting still marked $A^1$, the vapors from which are carried to condensers and then condensed and collected separately. Any of the reflux condensers may be by-passed, as for example reflux condenser $B^2$, by closing valves 6, 3 and 20 and opening valves 7 and 21.

As will be noted the oil normally passes from the main line E to each of the refluxers $B^2$ to $B^5$ through branch pipes $E^a$, $E^a$, in which are located the valves 5, 16 respectively. A corresponding branch pipe $E^a$ leads from the main line to the refluxer $B^6$ and this refluxer may be by-passed from the circulating body of oil by closing the valve 5 and opening the valve 4. Normally the valve 4 is closed and the vale 5 is opened. Valve $F^{13}$ acts the same as valve $F^3$ when the vapors are not passed through reflux condenser $B^1$. At this time the valve $H^{16}$ is opened.

From the above description it will be apparent that the raw material is first preheated by the heat units extracted in cooling the heated vapors and gases, second, that the material treated is progressively subjected to increasing temperatures while maintaining any desired pressure on the vapors generated, and that the resultant vapors are caused to travel in the reverse direction, that is, through progressively decreasing temperatures, while caused to percolate up through the liquid so that the liquid, vapors and gases are present in the zones of re-action, and the vapors and gases progressively advanced toward the sill or through a portion of the apparatus having a lower temperature. The temperature to which the oil is heated may vary during the process from a minimum of 200 degrees F. to 500 degrees F. and from a maximum of 500 degrees F. to 2000 degrees F. The pressure may vary from a minimum of 50 pounds to the square inch to a maximum of 1000 pounds to the square inch.

While I have shown and described a particular apparatus for carrying out my method, the latter is not limited to use with the particular apparatus shown and described. Also various changes in the details of construction, connections and operations of the apparatus can be made within the scope of my invention.

I claim as my invention:

1. A process of distilling petroleum to produce lower boiling point hydro-carbons, which consists in passing petroleum through a series of receptacles, subjecting the petroleum to progressively increasing temperatures in said receptacles, taking the vapors off from each receptacle, and passing them back through the body of the oil in a preceding receptacle in the reverse direction to the flow of the oil by positively applied pressure, and during said distillation, maintaining a pressure in excess of 50 pounds to the square inch throughout the system, sufficient to convert a portion of the oil into lower boiling point hydro-carbons.

2. A process of distilling petroleum to produce lower boiling point hydro-carbons, which consists in passing the petroleum through a series of receptacles, subjecting the petroleum to progressively increasing temperatures in said receptacles, taking the vapors off from said receptacles, and passing them back through the oil in the reverse direction to the flow of the oil by positively applied pressure and during said distillation, maintaining a pressure throughout the system, sufficient to convert a portion of the oil into lower boiling point hydro-carbons, the temperature during such process varying from a minimum of 200 degrees Fahr. to 500 degrees Fahr. and the maximum from 500 degrees Fahr. to 2000 degrees Fahr.

3. A process of distilling petroleum to produce lower boiling point hydro-carbons, which consists in passing the petroleum through a series of receptacles, subjecting the petroleum to progressively increasing temperatures in said receptacles, taking the vapors off from said receptacles and passing them back through the oil in the reverse direction to the flow of the oil, by positively applied pressure, and during said distillation maintaining a pressure throughout the system, sufficient to convert a portion of the oil into lower boiling point hydrocarbons, the temperature during such process varying from a minimum of 200 degrees Fahr. to 500 degrees Fahr. and the maximum from 500 degrees Fahr. to 2000 degrees Fahr., the pressure varying from a minimum of 50 pounds to the square inch to a maximum of 1000 pounds to the square inch.

4. A process of treating hydro-carbon oil which consists in passing a body of oil through a plurality of heating zones of predetermined temperatures, subjecting the oil to increasing temperatures as it passes through the zones, collecting vapors from the various zones and returning them by paths, other than by the main path of the oil, back to a zone of lower temperature than that at which they were formed, forcing these vapors to pass up through the body of oil in said zone of lower temperature and passing that portion of the vapor that is condensed in said zone of lower temperature back through the flowing body of oil, to be again subjected to the higher temperature while the uncondensed vapors pass out of the system and are condensed and collected.

5. A process of treating hydro-carbon oil which consists in passing a body of oil through a plurality of heating zones of predetermined temperatures, subjecting the oil to increasing temperatures as it passes through the zones, collecting the vapors from each zone and returning them by paths, other than by the main path of the oil, back to the adjacent zone of lower temperature, forcing these vapors to pass up through the body of oil in said zone of lower temperature and passing that portion of the vapor that is condensed in said zone of lower temperature back through the flowing body of oil, to be again subjected to the higher temperatures, while the uncondensed vapors pass out of the system and are condensed and collected, the oil during distillation being subjected to a pressure in excess of 50 pounds to the square inch and to a temperature varying from a minimum of not less than 200 F. to a maximum of not more than 2000 F.

6. A process of treating petroleum for obtaining a product having a relatively low boiling point which consists in passing a body of petroleum through a plurality of pools in which said petroleum while under pressure is subjected to different temperatures, the unvaporized residue from the first pool overflowing into the adjacent pool of higher temperature, forcing the vapors arising in the last named pool to pass back through the body of petroleum contained in the first named pool, the portion of said vapors having a boiling point higher than the temperature of the first named pool being condensed therein and passing with said residue to the second named pool, and collecting and condensing the other portion of said vapors with vapors converted from the petroleum contained in the first named pool.

7. A process for converting petroleum into lower boiling point hydro-carbons consisting in collecting the oil in a plurality of pools and while under pressure subjecting the pools of oil to progressively increasing temperatures, continuously supplying the oil to the pool of lowest temperature and conducting the overflow from each pool to the pool of next higher temperature, condensing and collecting vapors arising from the pool of lowest temperature and forcing vapors arising from each of the other pools back, by paths other than the path of the oil in its passage from pool to pool, and into the lower portion of the body of oil in the pool of next lower temperature, substantially as described.

8. A process for converting petroleum into lower boiling point hydro-carbons consisting in collecting the oil in a plurality of pools and while under pressure subjecting the pools of oil to progressively increasing temperatures, continuously supplying the oil to the pool of lowest temperature and conducting the overflow from each pool to the pool of next higher temperature, condensing and collecting vapors arising from the pool of lowest temperature and removing vapors from each pool, other than that of lowest temperature, passing them through a reflux condenser associated with the pool, returning the condensed products back to the pool and forcing the remaining vapors back through the pool of next lower temperature.

CARBON P. DUBBS.